United States Patent [19]
Ruszczyk et al.

[11] Patent Number: 5,886,993
[45] Date of Patent: Mar. 23, 1999

[54] SYSTEM, DEVICE, AND METHOD FOR SHARING CONTENTION MINI-SLOTS AMONG MULTIPLE PRIORITY CLASSES

[75] Inventors: Chester A. Ruszczyk, Chicago, Ill.; Whay Chiou Lee, Cambridge, Mass.; Imrich Chlamtac, Dallas, Tex.

[73] Assignee: Motorola, Inc., Schaumburg, Ill.

[21] Appl. No.: 865,924

[22] Filed: May 30, 1997

[51] Int. Cl.$^6$ .................................................. H04J 3/14
[52] U.S. Cl. ................................. 370/451; 370/461
[58] Field of Search ................................. 370/431, 439, 370/443, 444, 445, 447, 449, 450, 451, 452, 453, 454, 455, 456, 458, 459, 460, 461, 464, 465, 468, 470, 522; 340/825.5, 825.51, 825.06, 825.07, 825.08, 825.03

[56] References Cited

U.S. PATENT DOCUMENTS

| | | | |
|---|---|---|---|
| 4,907,224 | 3/1990 | Scoles | 340/825.51 |
| 5,303,234 | 4/1994 | Kou | 370/459 |
| 5,615,212 | 3/1997 | Ruszczyk et al. | |
| 5,631,906 | 5/1997 | Liu | 370/455 |

OTHER PUBLICATIONS

Gallager, Robert; "A Perspective on Multiaccess Channels," IEEE Transactions on Information Theory, vol. IT–31, No. 2, Mar. 1985, pp. 124–142.

Capetanakis, John I.; "Generalized TDMA: The Multi-–Accessing Tree Protocol," IEEE Transactions on Communications, vol. COM–27, No. 10, Oct. 1979, pp. 200–208.

Xu, Wenxin; Campbell, Graham; "A Distributed Queueing Random Access Protocol for a Broadcast Channel," ACM SIGCOMM '93, Sep. 1993, pp. 270–278.

Mosley, Jeannine; Humblet, Pierre; "A Class of Efficient Contention Resolution Algorithms for Multiple Access Channels," IEEE Transactions on Communications, vol. COM–33, No. 2, Feb. 1985, pp. 145–151.

Lee, Hyong W.; Mark, Jon W.; "Combined Random/Reservation Access for Packet Switched Transmission Over a Satellite with On–Board Processing: Part I—Global Beam Satellite," IEEE Transactions on Communications, vol. COM–31, No. 10, Oct. 1983, pp. 1161–1171.

Mark, Jon W.; "Distributed Scheduling Conflict–Free Multiple Acces for Local Area Communication Networks," IEEE Transactions on Communications, vol. COM–28, No. 12, Dec. 1980, pp. 1968–1976.

Tobagi, F.; Kleinrock, L.; "Packet Switching in Radio Channels: Part III—Polling and (Dynamic) Split Channel Reservation Multiple Access," IEEE Transactions on Communications, vol. 24, No. 8, Aug. 1976.

*Primary Examiner*—Huy D. Vu
*Attorney, Agent, or Firm*—Jeffrey T. Klayman

[57] ABSTRACT

A system, device, and method for sharing contention mini-slots among multiple priority classes determines an aggregate feedback state for each of the priority classes, determines a preferred allocation of contention mini-slots for each of the plurality of priority classes using the aggregate feedback state, and determines an actual allocation of contention mini-slots for each of the plurality of priority classes using the preferred allocation. The actual allocation of contention mini-slots is determined by making a preliminary allocation for each of the priority classes based on the preferred allocation and then allocating any remaining contention mini-slots among the priority classes.

38 Claims, 9 Drawing Sheets

SYSTEM, DEVICE, AND METHOD FOR SHARING CONTENTION MINI-SLOTS AMONG MULTIPLE PRIORITY CLASSES

CROSS-REFERENCE TO RELATED APPLICATIONS

This application is related to the following U.S. application, owned by the same assignee as the assignee of this application, incorporated herein by reference in its entirety:

System, Device, and Method for Contention-Based Reservation in a Shared Medium Network, to Chester A. Ruszczyk, Whay Chiou Lee, and Imrich Chlamtac, Ser. No. 08/866,865 filed on even date herewith (Attorney Docket Number CX096053).

BACKGROUND

1. Field of the Invention

The invention relates generally to communication systems and, more particularly, to multiple access protocols for supporting users having different priority classes.

2. Discussion of Related Art

In today's information age, there is an increasing need for high speed communications that provides guaranteed quality of service (QoS) for an ever-increasing number of communications consumers. To that end, communications networks and technologies are evolving to meet current and future demands. Specifically, new networks are being deployed which reach a larger number of end users, and protocols are being developed to utilize the added bandwidth of these networks efficiently.

One technology that has been widely employed and will remain important in the foreseeable future is the shared-medium network. A shared medium network is one in which a single communications channel (the shared channel) is shared by a number of end users such that uncoordinated transmissions from different end users may interfere with one another. In modern broadband communications networks, the shared communications channel is typically one of a number of frequency bands carried over a shared physical medium, such as a hybrid fiber-optic/coaxial cable (HFC) network or by electromagnetic waves in free space. Since communications networks typically have a limited number of communications channels, the shared medium network allows many end users to gain access to the network over a single communications channel, thereby allowing the remaining communications channels to be used for other purposes. However, the shared medium network is only feasible when each end user only transmits data intermittently, allowing other end users to transmit during periods of silence.

In the shared medium network, each end user interfaces to the shared channel by means of an Access Interface Unit (AIU) which allows the end user to transmit and receive information via the shared channel. A single AIU may support one or a number of end users. Each end user wishing to utilize the shared channel participates in a Medium Access Control (MAC) protocol which provides a set of rules and procedures for accessing the shared channel. For convenience, each participant in the MAC protocol is referred to as a MAC User.

One type of shared medium network utilizes a single headend unit for coordinating access by the MAC Users to the shared channel. The headend unit is typically situated at a common receiving end of the shared channel and is able to transmit messages to all MAC Users that share the channel. The headend unit coordinates access to the shared channel by sending control messages to the MAC Users which enable one or more MAC Users to transmit. MAC Users only transmit when enabled to do so by the headend unit.

FIG. 1 shows an exemplary shared medium network 100 as is known in the art. As illustrated in FIG. 1, a headend unit 110 is coupled to a plurality of AIUs $120_a$ through $120_n$ (collectively referred to as AIUs 120) via a shared channel 130. In the preferred embodiment, the shared channel 130 is one of a number of communications channels carried by a shared physical medium such as a hybrid fiber-optic/coaxial cable (HFC) or wireless network. In other embodiments, the shared physical medium may be coaxial cable, fiber-optic cable, twisted pair wires, and so on, and may also include air, atmosphere, or space for wireless and satellite communication. The headend unit 110 is also coupled to a communications network 140, which may include networks such as the Internet, on-line services, telephone and cable networks, and other communication systems.

Continuing to refer to FIG. 1, in the preferred embodiment, the shared physical medium, such as an HFC or wireless network, has or supports a plurality of communications channels. For ease of reference, the communications channels in which a headend unit, such as the headend unit 110, transmits information, signals, or other data to an AIU, such as AIU $120_n$, are referred to as downstream channels. Also for ease of reference, the communications channels in which an AIU, such as AIU $120_n$, transmits information, signals, or other data to a headend unit, such as headend unit 110, are referred to as upstream channels. These various upstream and downstream channels may, of course, be the same physical channel, for example, through time-division multiplexing and duplexing. They may also be separate physical channels, for example, through frequency-division multiplexing and duplexing. These various channels may also be logically divided in other ways, in addition to upstream and downstream directions. In the preferred embodiment, the communications medium is an HFC network, with downstream channels in the frequency spectrum (band) typically 50–750 MHz (and up to 1 GHz), and with upstream channels in the frequency spectrum typically 5–42 MHz.

In a simple model of an exemplary HFC network, the headend unit uses a single downstream channel to send information to a group of MAC Users, and a single upstream channel is used by all (or a number) of the group of MAC Users to send information to the headend unit. Since the headend unit is the only device which transmits on the downstream channel, the downstream channel is not a "shared channel" as that term is applied to the present invention. However, since multiple MAC Users transmit on the upstream channel, the upstream channel is a shared channel, and the MAC protocol must provide for orderly access to the channel so as to maximize the data throughput over the channel.

A number of different MAC protocols have been developed for use over a shared medium network. These protocols can generally be categorized as contention-free protocols, which avoid collisions on the shared channel by means of various scheduling methods, and contention-based protocols, which do not avoid collisions but instead resolve any collisions that do occur on the shared channel. Contention-free protocols, such as time-division multiple access (TDMA) and round-robin polling, are typically less efficient than contention-based protocols under light loads (i.e., many idle MAC Users) because the contention-free protocols generally allocate some amount of bandwidth to each MAC User whether or not the MAC User has information to send. On the other hand, contention-based protocols only allocate bandwidth to those MAC Users that have information to send, although some amount of bandwidth is wasted whenever collision resolution is required. Under heavy loads (i.e., many active MAC Users), there are likely to be many collisions. Thus, the effectiveness of a MAC protocol is generally dependent on the number of MAC Users as well as the amount of information they have to send.

One type of MAC protocol utilizes a reservation system in which each MAC User that wants to transmit data on the shared channel is required to make a reservation with the headend unit. Each MAC User that has data to transmit but has not already made a reservation waits for contention opportunities provided by the headend unit. Each contention opportunity is provided to a selected group of MAC Users, and allows each of the MAC Users in the specified group to contend for a reservation at a specific time provided it has data to send. For convenience, the term "data" is used generically to mean a collection of bits of information that may carry various forms of multimedia signals (e.g., voice, video, etc.).

In a typical contention-based reservation system such as the system described immediately above, the MAC Users contend for the shared channel as peers. In other words, when a number of MAC Users are given an opportunity to contend, any of the number of MAC Users having data to transmit may contend. When the MAC Users are distinguishable by different QoS requirements, low-priority MAC Users can force collisions with high-priority MAC Users, and collision resolution may allow low-priority MAC Users to transmit before high-priority MAC Users. When low-priority MAC Users prevail over high-priority MAC Users, it becomes more difficult for the system to meet the QoS requirements of the high-priority MAC Users. Therefore, a need remains for a system, device, and method for sharing contention mini-slots among multiple priority classes.

BRIEF DESCRIPTION OF THE DRAWING In the Drawing.

DETAILED DESCRIPTION

Figure 1:
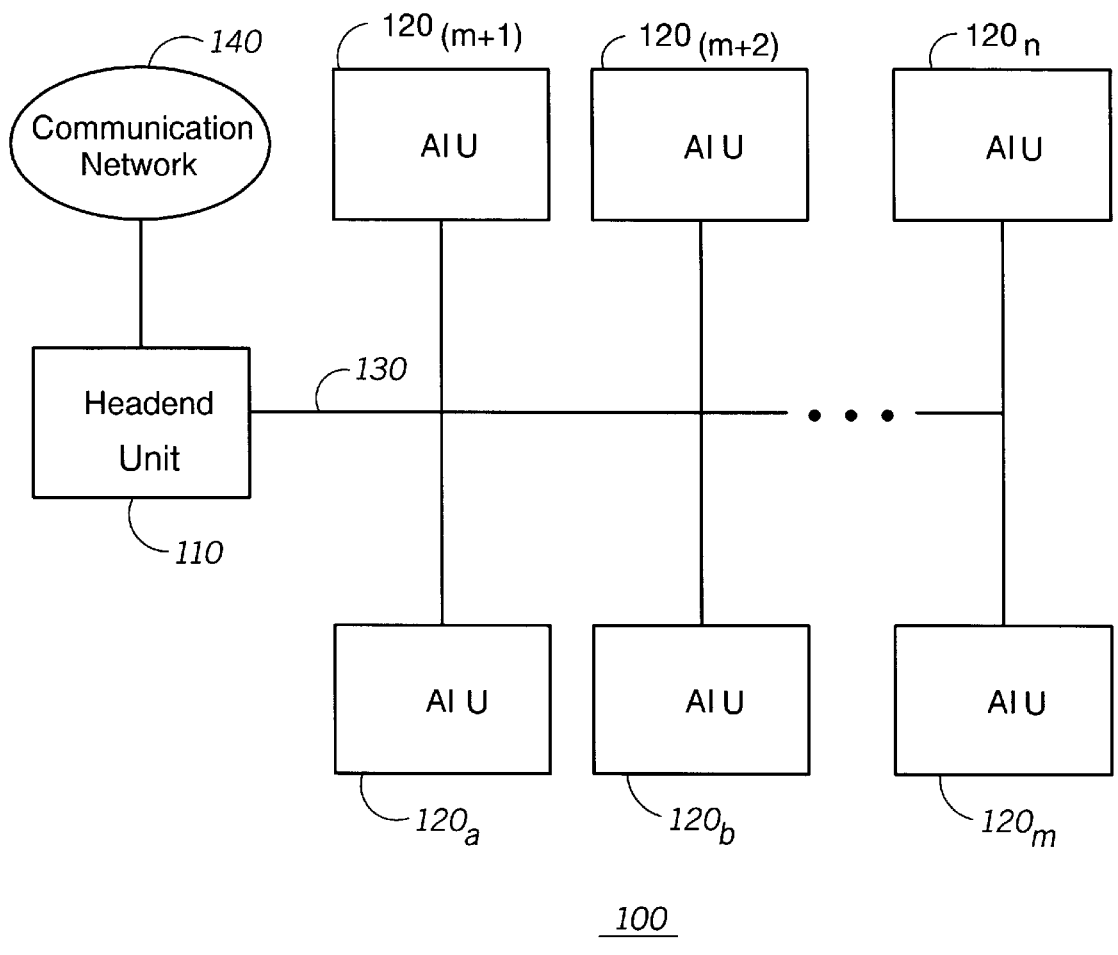
FIG. 1 is a block diagram of a shared medium network as is known in the art.

As discussed above, the need remains for a system, device, and method for sharing contention mini-slots among multiple priority classes. This invention groups MAC Users into multiple priority classes and dynamically provides separate contention opportunities for different priority classes. When collisions are detected for multiple priority classes, the higher priority classes are first considered for collision resolution. Lower priority classes are considered for collision resolution if and when bandwidth is available to provide them with additional contention opportunities.

The preferred embodiment of the present invention is based on the MAC protocol as described in U.S. patent application entitled System, Device, and Method for Contention-Based Reservation in a Shared Medium Network, to Chester A. Ruszczyk, Whay Chiou Lee, and Imrich Chlamtac, filed on even date herewith and incorporated above by reference in its entirety (hereinafter referred to as "PROTOCOL APPLICATION"). PROTOCOL APPLICATION describes a MAC protocol which utilizes a hybrid collision resolution technique combining both Probabilistic Tree Splitting (PTS) and First-Come-First-Served Splitting (FCFSS) techniques, and applies the MAC protocol to a slotted system having a single priority class of MAC Users. The present invention applies the MAC protocol to a system having multiple priority classes, where each AIU can support MAC Users from one or more priority classes.

When multiple priority classes are supported, a separate state-based context is maintained for each priority class. The state-based context includes a separate Collision Resolution Interval (CRI) for the priority class and a priority class state machine indicating, among other things, whether the priority class is in the normal state or the collision resolution state.

For each contention cycle, the headend unit transmits via the downstream channel an entry poll message which controls access to the upstream channel for the contention cycle. The entry poll message includes feedback information for each contention mini-slot in the preceding contention cycle and an assignment of contention mini-slots for the current contention cycle. Each contention mini-slot in the entry poll message is assigned to a particular priority class, and the headend unit varies the number of contention mini-slots assigned to each priority class during each contention cycle according to the number of contention mini-slots available, the number of priority classes, and the state of each priority class.

As described in PROTOCOL APPLICATION, the number of contention mini-slots per contention cycle may be fixed or variable. If the number of contention mini-slots in each contention cycle is at least equal to twice the number of priority classes (or can vary to at least twice the number of priority classes), then the collision resolution procedure can employ single or double emphasis as needed for each priority class. However, in the preferred embodiment, the number of contention mini-slots in each contention cycle is fixed and is less than twice the number of priority classes (and preferably equal to the number of priority classes). Consequently, the possibility exists that there will be an insufficient number of contention mini-slots for providing each priority class with its preferred number of contention mini-slots (i.e., one contention mini-slot normally or two contention mini-slots during collision resolution).

When there is an insufficient number of contention mini-slots to meet the requirements of all of the priority classes, the headend unit must allocate some of the priority classes less than their preferred number of contention mini-slots. The headend unit attempts to meet the requirements of higher priority classes, and allocates contention mini-slots to the lower priority classes only if contention mini-slots are available. In some cases, the headend unit allocates one contention mini-slot to a priority class that would preferably be allocated two contention mini-slots. In yet other cases, the headend unit allocates zero contention mini-slots to a priority class. For convenience, a priority class is said to be in "zero emphasis" when it is assigned zero contention mini-slots in the contention cycle.

At this point, it is convenient to define a general model of a multiple priority system wherein M represents the number of priority classes and Pk represents a particular priority class Pk, where k=1 to M in the order of increasing priority (i.e., M represents the highest priority class). During each contention cycle t, there are H(t) contention mini-slots shared among the M priority classes, and the number of contention mini-slots assigned to each priority class Pk during contention cycle t is represented by Nk(t) for k=1 to M.

As alluded to above, if H(t) is variable up to at least 2M, then the MAC protocol can provide each priority class Pk with its preferred number of contention mini-slots. In this case, H(t) is determined by the sum N1(t)+N2(t)+. . . +NM(t). However, it is more likely that H(t) will be constrained either to a fixed value or by some formula for determining a preferred number of contention mini-slots per contention cycle. In this case, the values for Nk(t) must be selected so that the sum N1(t)+N2(t)+. . . +NM(t) is less than or equal to H(t).

When selecting the values Nk(t) to meet the above constraint on H(t), constraints may be placed on the number of contention mini-slots that can be assigned to each priority class Pk. One constraint is that certain priority classes may be guaranteed a minimum number of contention mini-slots. The minimum number of contention mini-slots that can be assigned to Pk is represented by Ak. In a preferred embodiment, the value of Ak for priority class M is one, which guarantees that the highest priority class is allocated at least one contention mini-slot per contention cycle, while the value of Ak for each of the remaining priority classes is zero. The values Ak may be set individually for each priority class in order to favor higher priority classes. For example, in one embodiment, Ak is set individually for each priority class such that $0 \leq A_1 \leq A_2 \leq \ldots \leq A_M \leq 1$.

Another constraint is that certain priority classes may be limited to a maximum number of contention mini-slots. The maximum number of contention mini-slots that can be assigned to Pk is represented by Bk. The values Bk will typically be set to a constant value for all priority classes, and is preferably equal to two (i.e. a maximum allocation of double emphasis). However, the values Bk may be set individually for each priority class in order to favor higher priority classes. For example, in one embodiment, Bk is set individually for each priority class such that $1 \leq B_1 \leq B_2 \leq B_3 \leq \ldots \leq B_M$. Note that it is necessary for Bk to be greater than or equal to Ak for each priority class Pk.

As discussed in PROTOCOL APPLICATION, ternary feedback is available for each contention mini-slot. The aggregate feedback state for a particular priority class Pk during a contention cycle t is referred to as Fk(t) and is dependent upon the individual feedback state(s) of the contention mini-slot(s) allocated to the priority class during the contention cycle. If the priority class is allocated one contention mini-slot (i.e., the priority class is in single emphasis), then the aggregate feedback state for the priority class is equal to the feedback state for the single contention mini-slot. If the priority class is allocated more than one contention mini-slot (e.g., the priority class is in double emphasis), then the aggregate feedback state for the priority class is a function of the feedback states for all of the contention mini-slots assigned to that priority class. Specifically, the aggregate feedback state is IDLE if the result is IDLE for all contention mini-slots; COLLISION if the result is COLLISION for at least one contention mini-slot; and SUCCESS otherwise. If the priority class is allocated zero contention mini-slots in a contention cycle (i.e., the priority class is in zero emphasis), then the aggregate feedback state for the priority class takes on the value NONE, and the priority class is said to have sat out or be on vacation for the contention cycle.

A number of conventions are used when describing the logic for the multiple priority system below. For the sake of simplicity, the variable t (used to represent a particular contention cycle) is omitted. The sub-interval for priority class Pk is represented by Uk, which can take on one of three values: "L", "R", and "T". The stage of collision resolution, indicating the number of times the CRI has been split, is represented by Vk. Thus, the current state of priority class Pk can be characterized by $N_k/U_k/V_k$. The number of contention mini-slots in a contention cycle H is typically constrained to be less than 2M because the case where H is greater than or equal to 2M is a trivial case, as each priority class can be guaranteed two or more contention mini-slots all the time. Where Bk is equal to two, the only possible values for Nk are zero, one, or two, corresponding to zero, single, and double emphasis, respectively. A priority class Pk may be placed in zero emphasis (i.e., Nk=0), for example, when there is an insufficient number of contention mini-slots available due to congestion at higher priority classes. The number of iterations that a priority class Pk can be in double emphasis is represented by Xk.

Figure 2:
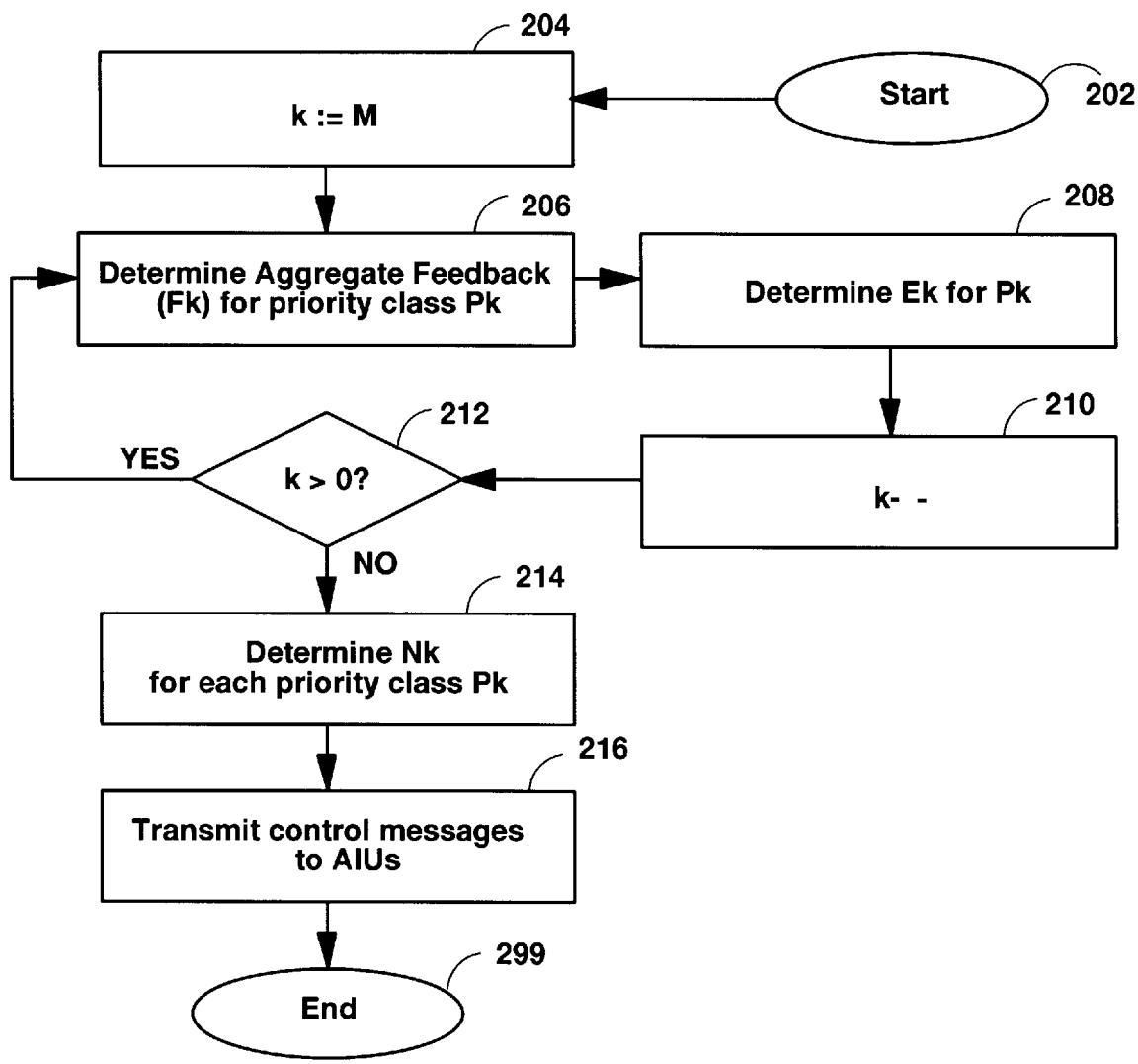
FIG. 2 is a flow diagram for determining the number of contention mini-slots assigned to each priority class.

The number of contention mini-slots allocated for each priority class is determined by the total number of contention mini-slots available and the individual states of the priority classes. FIG. 2 is a flow diagram for determining the number of contention mini-slots Nk assigned to priority class Pk. The logic employs a variable k to indicate a current priority class. The logic begins in step 202 and proceeds to step 204, where the logic initializes the variable k. The variable k is set equal to M, which is the number of the highest priority class. The logic then determines the aggregate feedback state for priority class Pk, in step 206, and determines a preferred allocation Ek for the priority class, in step 208. The selection of Ek is a state-based determination and is made without regard to the relative priority of the priority class.

After determining the preferred allocation Ek for priority class Pk in step 208, the logic decrements k to the next lower priority class in step 210. If one or more priority classes remain to be serviced (i.e., if k >0 in step 212), then the logic loops back to step 206 to determine the aggregate feedback state and preferred allocation for the next priority class Pk. However, if all priority classes have been serviced (i.e., if k=0 in step 212), then the logic proceeds to determine an actual allocation Nk for each priority class Pk in step 214. The selection of Nk involves policy-based determinations, for example, guaranteeing a minimum number of contention mini-slots to the highest priority class even though the priority class has a preferred allocation Ek of zero. After determining the actual allocation Nk for each priority class Pk, the logic transmits a control message (i.e., an entry poll message) to the AIUs, in step 216, and terminates in step 299.

Figure 3:
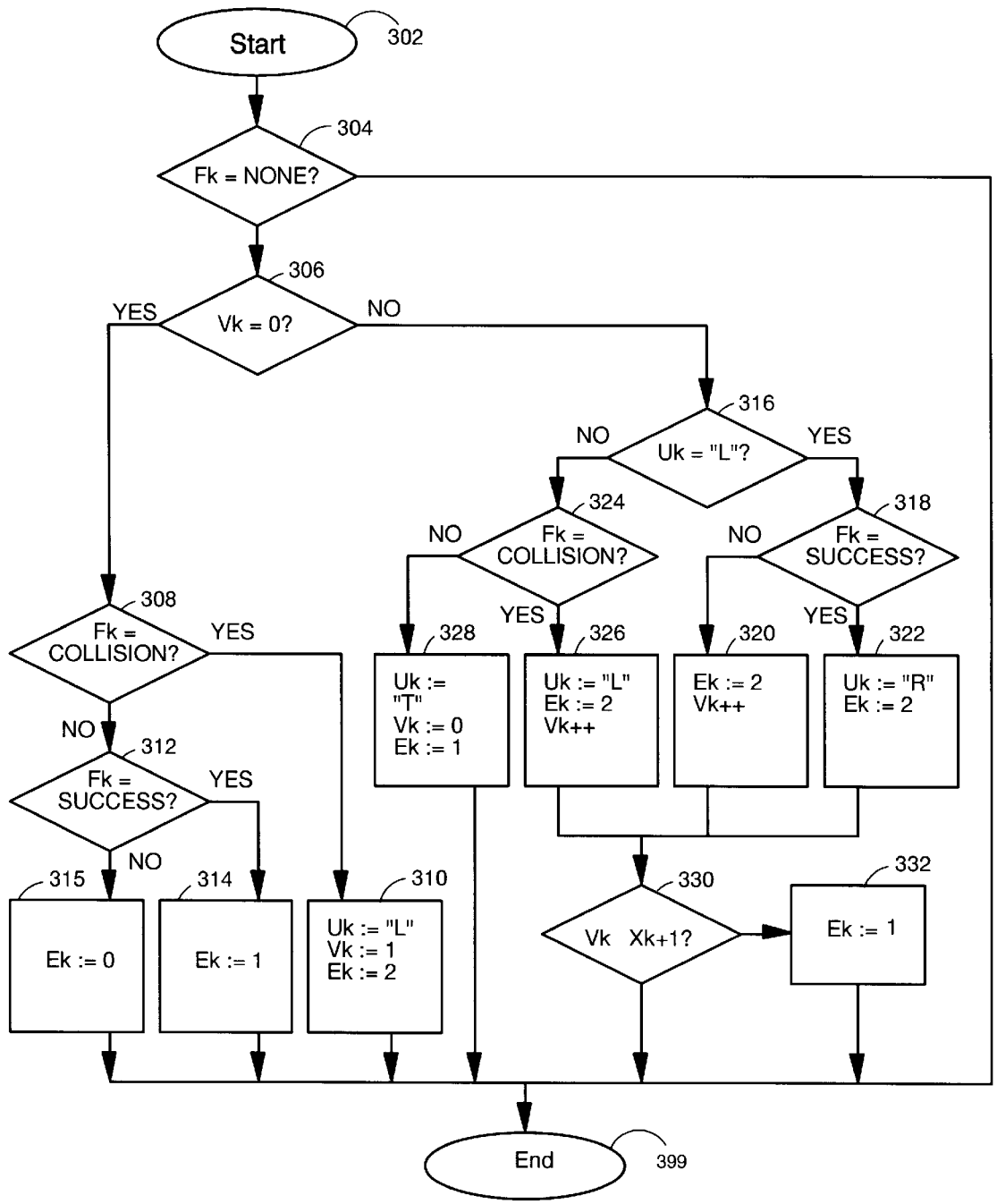
FIG. 3 is a flow diagram showing exemplary logic for determining a preferred number of contention mini-slots for each priority class.

FIG. 3 is a flow diagram showing exemplary logic for determining Ek for each priority class in accordance with the MAC protocol described in PROTOCOL APPLICATION. In order to determine Ek for the current contention cycle, the values Uk, Vk, Ek, and Fk from the immediately preceding contention cycle are used. Initially, Uk is equal to "T", Vk is equal to zero, Ek is equal to one, and Fk is equal to SUCCESS.

The logic begins at step 302 and proceeds to step 304. If the aggregate feedback state in step 304 is NONE, indicating that the priority class was not allocated any contention mini-slots during the previous contention cycle, then the priority class remains in the same state, and the logic terminates in step 399. Otherwise, the logic proceeds to step 306 and determines whether the priority class is in the normal state or the collision resolution state.

If the priority class is in the normal state (i.e., Vk=0) in step 306, then the logic proceeds to step 308. If the aggregate feedback state in step 308 is COLLISION, then the logic proceeds to step 310. In step 310, the older sub-interval is assigned (i.e., Uk="L"), the stage of collision resolution is set to one (i.e., Vk=1), and the preferred allocation is set to double emphasis (i.e., Ek=2). This will cause the headend unit to enter the collision resolution state and thereby to invoke the collision resolution procedure. If the aggregate feedback state in step 308 is IDLE or SUCCESS, then the logic proceeds to step 312. If the aggregate feedback state in step 312 is SUCCESS, then the preferred allocation is single emphasis (i.e., Ek=1) in step 314. If the aggregate feedback state in step 312 is IDLE, then the preferred allocation is zero emphasis (i.e., Ek=0) in step 315. Following step 310, 314, or 315, the logic terminates in step 399.

If the priority class is in the collision resolution state (i.e. Vk>0) in step 306, then the logic proceeds to step 316. If the collision resolution procedure is working on the older sub-interval in step 316 (i.e., Uk="L"), then the logic proceeds to step 318, otherwise the logic proceeds to step 324.

If the aggregate feedback state in step 318 is SUCCESS, then the logic continues the collision resolution procedure in step 322 by working on the newer sub-interval (i.e., Uk="R") and setting the preferred allocation to double emphasis (i.e., Ek=2).

If the aggregate feedback state in step 318 is IDLE or COLLISION, then the system remains in the collision resolution state and the logic proceeds to step 320 with the collision resolution procedure applied to either the newer sub-interval, if the aggregate feedback state is IDLE, or the older sub-interval, if the aggregate feedback state is COLLISION. The relevant sub-interval is referred to as a collision resolution sub-interval. In step 320, the stage of collision resolution is advanced (i.e., Vk++) and the preferred allocation is set to double emphasis (i.e., Ek=2). The sub-interval is unchanged (i.e., Uk="L").

If the aggregate feedback state in step 324 is COLLISION, then the system remains in the collision resolution state and the logic proceeds to step 326 with the collision resolution sub-interval equal to the newer sub-interval. In step 326, the collision resolution procedure is started at the older sub-interval (i.e., Uk="L"), the stage of collision resolution is advanced (i.e., Vk++), and the preferred allocation is set to double emphasis (i.e., Ek=2).

If the aggregate feedback state in step 324 is IDLE or SUCCESS, then the collision resolution procedure is complete and the logic transitions the priority class back into the normal state in step 328 by setting the collision resolution stage to zero (i.e., Vk=0) and by setting the preferred allocation to single emphasis (i.e., Ek=1). The sub-interval is reset (i.e., Uk="T"). Following step 328, the logic terminates in step 399.

After setting the preferred allocation to double emphasis in step 320, 322, or 326, the logic proceeds to step 330 to determine whether the collision resolution procedure has exceeded the predetermined number of double emphasis iterations Xk. If the stage of collision resolution is greater than the predetermined number of iterations (i.e., Vk≧Xk+1) in step 330, then the logic sets the preferred allocation to single emphasis (i.e., Ek=1) in step 332 and terminates in step 399. Otherwise, the logic allows the collision resolution procedure to continue in double emphasis, and terminates in step 399.

Figure 4:
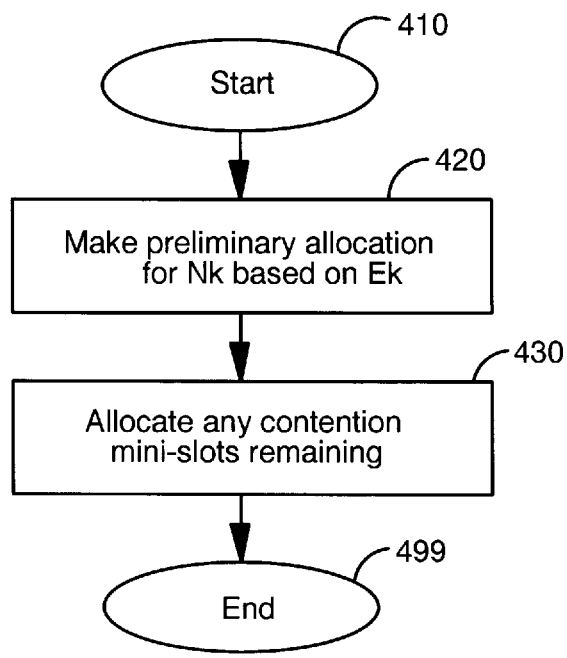
FIG. 4 is a flow diagram showing the steps for determining the actual number of contention mini-slots assigned to each priority class.

Once a preferred number of contention mini-slots Ek is determined for each priority class, the actual number of contention mini-slots assigned to each priority class Nk is determined. FIG. 4 is a flow diagram showing the steps for determining Nk for each priority class. The logic begins in step 410 and proceeds to step 420, where the logic makes a preliminary allocation of contention mini-slots based on the preferred allocation Ek for each priority class. Then, in step 430, the logic allocates any contention mini-slots that remain after the preliminary allocation stage. Contention mini-slots remaining after the preliminary allocation stage are allotted first to priority classes that were preliminarily assigned zero contention mini-slots, then to priority classes that are assigned one contention mini-slot, and continues in this manner until either all contention mini-slots are allocated or all priority classes have been assigned their maximum number of contention mini-slots (i.e., Bk). Finally, the logic terminates in step 499.

Figure 5:
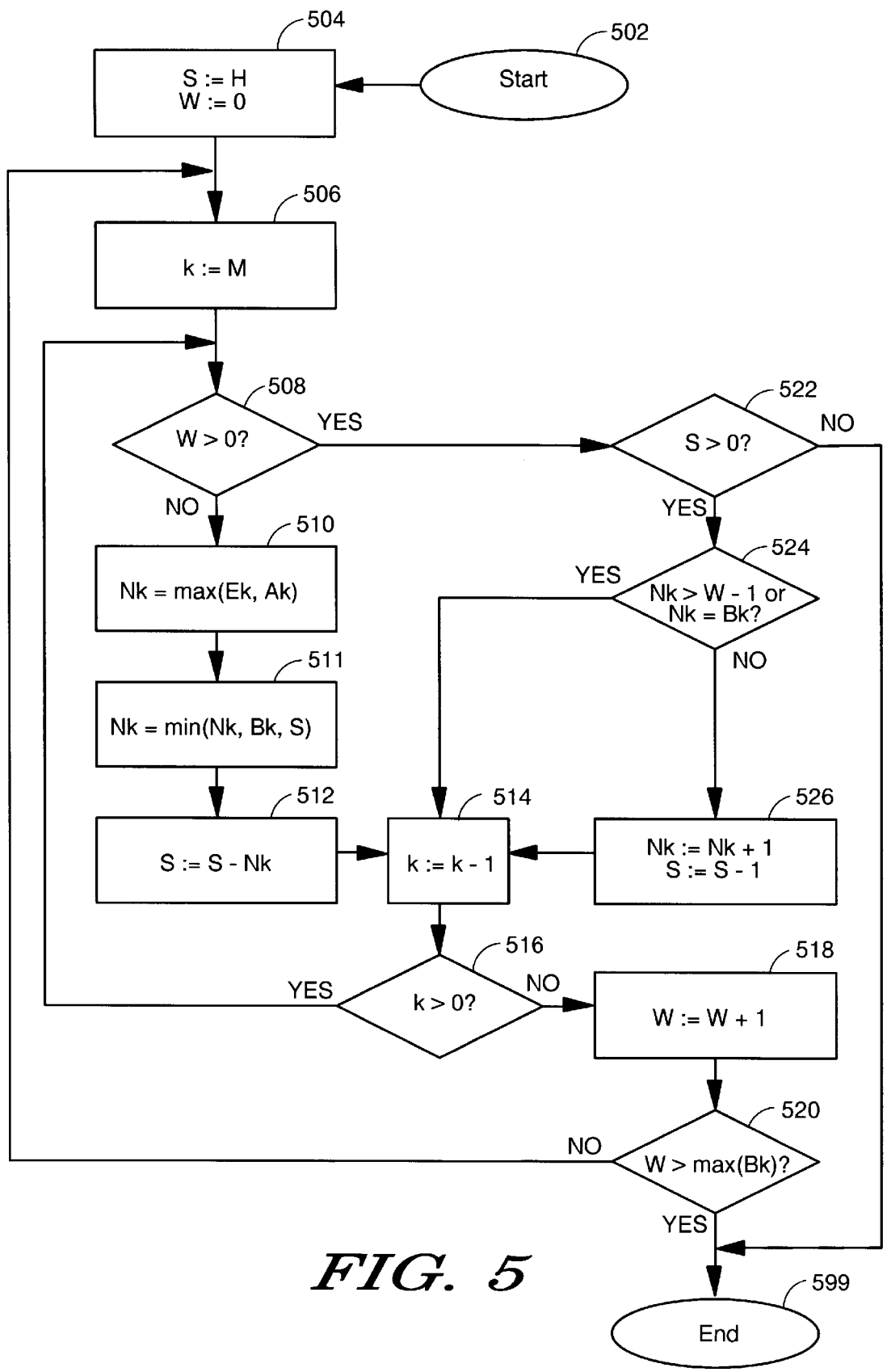
FIG. 5 is a flow diagram showing exemplary logic for determining the actual number of contention mini-slots assigned to each priority class.

FIG. 5 is a flow diagram showing exemplary logic for determining Nk for each priority class. This logic performs both the preliminary allocation of contention mini-slots and the allocation of remaining contention mini-slots. The logic employs three variables. The variable S indicates the number of contention mini-slots remaining to be allocated. The variable W indicates whether the logic is in the preliminary allocation stage (i.e., W=0) or the remaining allocation stage (i.e., W>0), and if in the remaining allocation stage, which iteration of that stage. The variable k indicates the priority class Pk for k=1 to M.

The logic begins in step 502 and proceeds to step 504, where the variables S and W are initialized. The variable S is set equal to the total number of contention mini-slots H. The variable W is set equal to zero to indicate the preliminary allocation stage.

After initializing the variables in step 504, the logic proceeds to step 506 where the variable k is initialized. The variable k is set equal to M, which is the number of the highest priority class. The variable k is initialized at the beginning of the preliminary allocation stage and at the beginning of each iteration of the remaining allocation stage.

Following step 506, the logic determines the allocation stage, in step 508. If the logic is in the preliminary allocation stage (i.e., if W=0 in step 508), then the logic determines a preliminary value of Nk for priority class Pk. The logic first sets Nk equal to the greater of the preferred allocation Ek and the minimum allocation Ak in step 510. Next, the logic sets Nk equal to the lesser of Nk from step 510, the maximum allocation Bk, and the number of available contention mini-slots S in step 511. The logic then decrements the variable S by the number of contention mini-slots allocated Nk, in step 512, and proceeds to step 514.

Step 514 and the steps that follow it are common to both the preliminary allocation stage and the remaining allocation stage. In step 514, the logic decrements k to the next lower priority class. If one or more priority classes remain to be serviced (i.e., if k>0 in step 516), then the logic loops back to step 508 and repeats the preliminary allocation logic for the next priority class. However, if all priority classes have been serviced (i.e., if k=0 in step 516), then the logic increments the variable W, in step 518, to enter the remaining allocation stage.

The remaining allocation stage allocates any contention mini-slots remaining after the preliminary allocation stage. The remaining allocation logic distributes additional contention mini-slots among the priority classes, first assigning one contention mini-slot to priority classes having zero contention mini-slots, then assigning two contention mini-slots to priority classes having one contention mini-slot, and continuing to provide additional contention mini-slots in this manner until either all contention mini-slots have been assigned or all priority classes have been assigned their maximum number of contention mini-slots. The remaining allocation logic does not allocate more than the maximum number of contention mini-slots Bk for each priority class.

After incrementing the variable W in step 518, the logic determines if all priority class have been assigned their maximum allocation Bk, in step 520. If all priority classes have been assigned their maximum allocation (i.e., if W>max(Bk) in step 520), then the logic terminates in step 599. Otherwise, the logic cycles to step 506 where the variable k is reset to M.

Following step 506, the logic determines the allocation stage, in step 508. If the logic is in the remaining allocation stage (i.e., if W>0 in step 508), then the logic proceeds to step 522 where it determines if there are any remaining contention mini-slots to be assigned. If there are no remaining contention mini-slots (i.e., if S=0 in step 522), then the logic terminates in step 599. If there are remaining contention mini-slots (i.e., if S>0 in step 522), then the logic proceeds to step 524 to determine whether or not to assign one additional contention mini-slot to the current priority class Pk.

As discussed above, the remaining allocation logic first assigns one contention mini-slot to priority classes with zero contention mini-slots, then two contention mini-slots to priority classes with one contention mini-slot, and continues assigning contention mini-slots in this manner until either all contention mini-slots are assigned or all priority classes have been assigned their maximum number of contention mini-slots. In order to accomplish this assignment pattern, the remaining allocation logic is repeated, with the variable W incremented each iteration to indicate the number of iterations through the remaining allocation logic. During the first iteration of the remaining allocation logic, the variable W is equal to one (1) and the logic will assign one contention mini-slot to priority classes having Nk equal to zero contention mini-slots. During the second iteration of the remaining allocation logic, the variable W is equal to two (2) and the logic will assign two contention mini-slots to priority classes having Nk equal to one contention mini-slot. Thus, the logic assigns one additional contention mini-slot to a priority class if the number of contention mini-slots Nk is less than the variable W and is also less than the maximum allowable number of contention mini-slots Bk.

In step 524, the logic determines whether or not to assign an additional contention mini-slot to the current priority class. If in step 524 the number of contention mini-slots Nk is greater than the value (W −1) or is equal to the maximum allowable number of contention mini-slots Bk, then the logic proceeds directly to step 514; otherwise, the logic proceeds to step 526 where it assigns an additional contention mini-slot by incrementing Nk and decrements the variable S to indicate that there is one less contention mini-slot available, and then proceeds to step 514. From step 514, the logic proceeds as described above.

After determining the actual number of contention mini-slots Nk for each priority class Pk, the headend unit transmits an entry poll message containing the individual feedback state for each contention mini-slot in the previous contention cycle and the assignment of contention mini-slots for the current contention cycle. The headend unit may also send individually-addressed targeted polls to those MAC Users that have made successful reservations in order to allow those MAC Users to transmit data contention-free in designated data slots.

Figure 6:
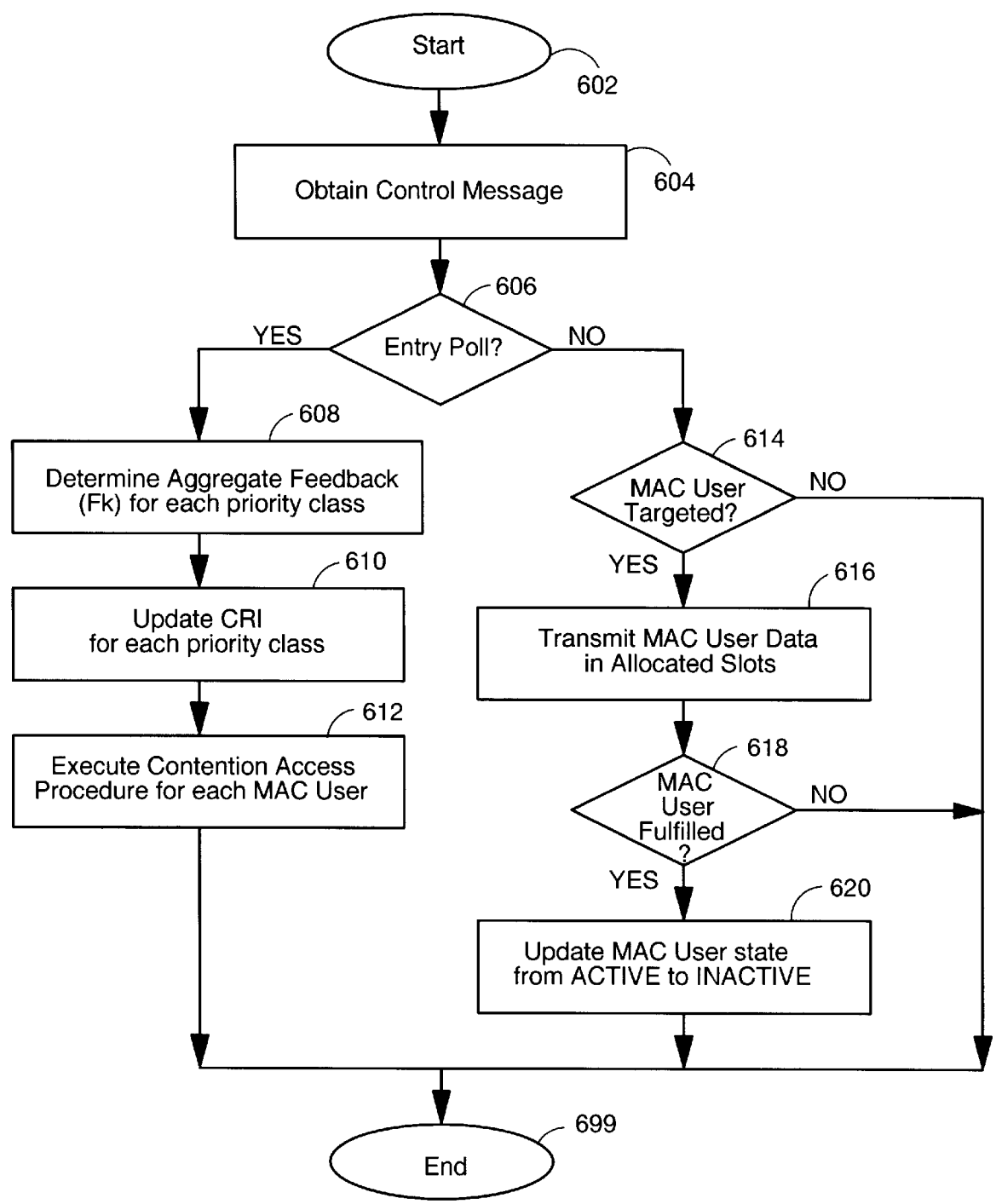
FIG. 6 shows exemplary logic for processing control messages received by the AIU.

An embodiment of exemplary logic for processing control messages received by the AIU is shown in FIG. 6. The AIU may support zero or more MAC Users from each priority class. The logic begins in step 602, and upon receipt of a control message in step 604, the logic determines whether the control message is an entry poll message or a targeted poll message in step 606. If the control message is an entry poll message in step 606, then the logic first determines the aggregate feedback state Fk for each priority class Pk for the previous contention cycle in step 608, updates the CRI for each priority class in step 610 based on the aggregate feedback state Fk for the priority class, executes the contention access procedure for each MAC User in step 612, and terminates in step 699. If the control message is a targeted poll message, then the logic proceeds to process the targeted poll as described in PROTOCOL APPLICATION.

Figure 7:
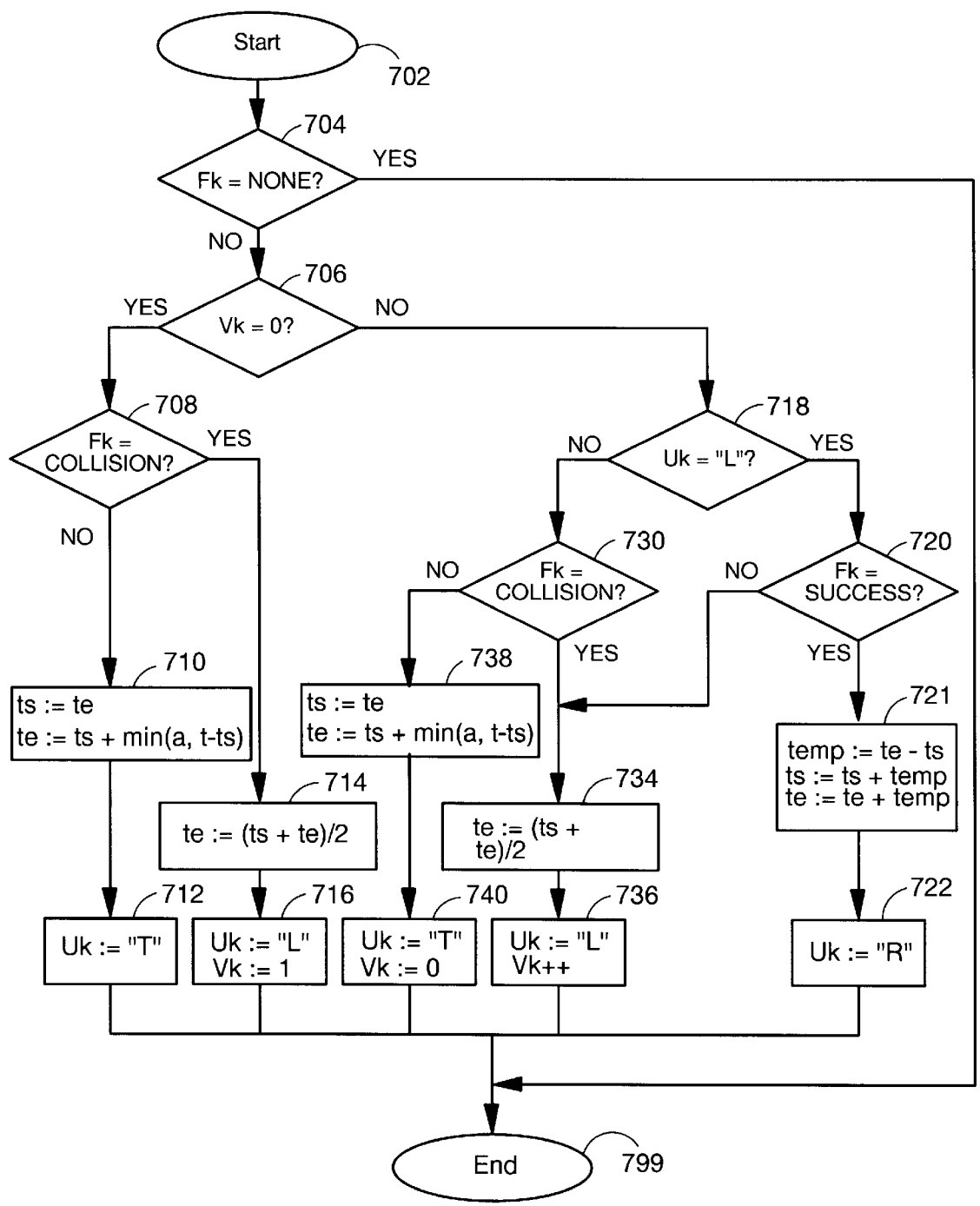
FIG. 7 shows exemplary logic for updating the Collision Resolution Interval.

Exemplary logic for updating the CRI for a priority class Pk is shown in FIG. 7. In order that all MAC Users remain synchronized, each MAC User implements the logic, even if the MAC User does not transmit a reservation request in one or more contention cycles. In FIG. 7, "t" denotes the present time, "ts" denotes the start time of a collision resolution interval or sub-interval, "te" denotes the end time of a collision resolution interval or sub-interval, and "a" denotes a predetermined maximum duration for a collision resolution interval.

The logic begins in step 702 and proceeds to step 704 where it checks the aggregate feedback state Fk for the priority class. If the aggregate feedback state Fk is equal to NONE, indicating that the priority class was in zero emphasis during the previous contention cycle, then the logic terminates in step 799 without changing the CRI or any of the state information for the priority class. Otherwise, the logic proceeds to update the CRI as described in PROTOCOL APPLICATION.

Figure 8:
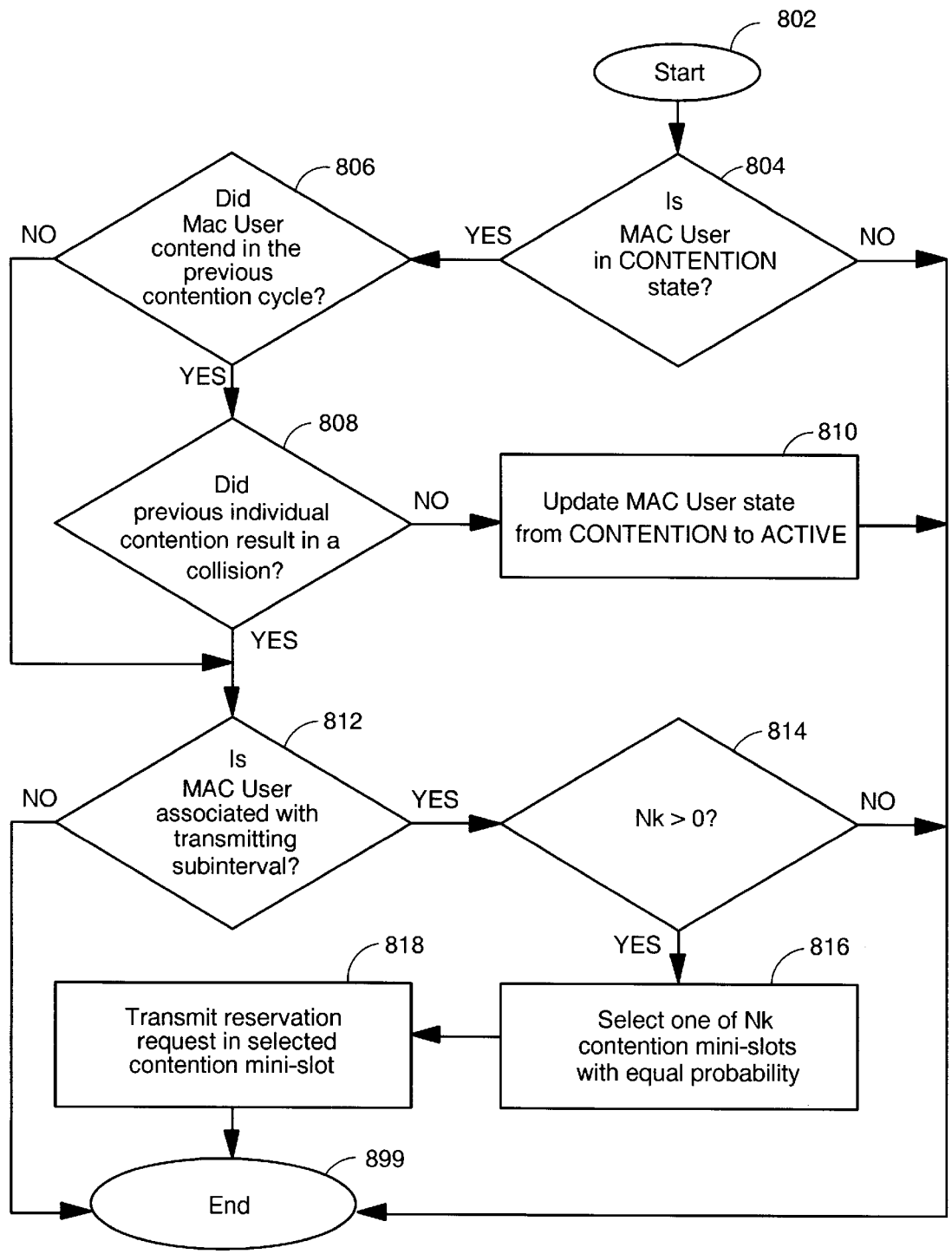
FIG. 8 shows exemplary logic for the contention access procedure.

Exemplary logic for the contention access procedure in the multiple priority case is shown in FIG. 8. A separate context of state information is maintained for each MAC User, and the contention access procedure is executed separately for each of the MAC Users.

The logic begins in step 802 and proceeds to step 804, where it determines the MAC User state. If the MAC User is not in the CONTENTION state in step 804, then the logic terminates in step 899. However, if the MAC User is in the CONTENTION state in step 804, then the logic checks whether or not the MAC User contended in the previous contention cycle (i.e., the contention cycle for which feedback information was received in the entry poll message). If the MAC User did not contend in the previous contention cycle, then the logic proceeds to step 812; otherwise, the logic checks the individual feedback state for the MAC User, in step 808. If the individual feedback state in step 808 is SUCCESS (even if the aggregate feedback state is COLLISION due to a collision in another contention mini-slot), then the logic updates the MAC User state from CONTENTION to ACTIVE in step 810 and terminates in step 899; otherwise, the logic proceeds to step 812.

In step 812, the logic checks whether the MAC User is associated with the transmitting sub-interval which was updated by the logic in FIG. 7. The MAC User is said to be associated with a transmitting sub-interval if the arrival time of the MAC User's message falls between the start time of the interval (i.e., ts) and the end time of the interval (i.e., te). If the MAC User is not associated with the transmitting sub-interval in step 812, then the logic terminates in step 899. However, if the MAC User is associated with the transmitting sub-interval in step 812, then the logic checks the number of contention mini-slots allocated to the priority class in step 814, and if at least one contention mini-slot is allocated to the priority class, proceeds to select one of the contention mini-slots with equal probability in step 816, transmit a reservation request in the selected contention mini-slot in step 818, and terminate in step 899.

Figure 9:
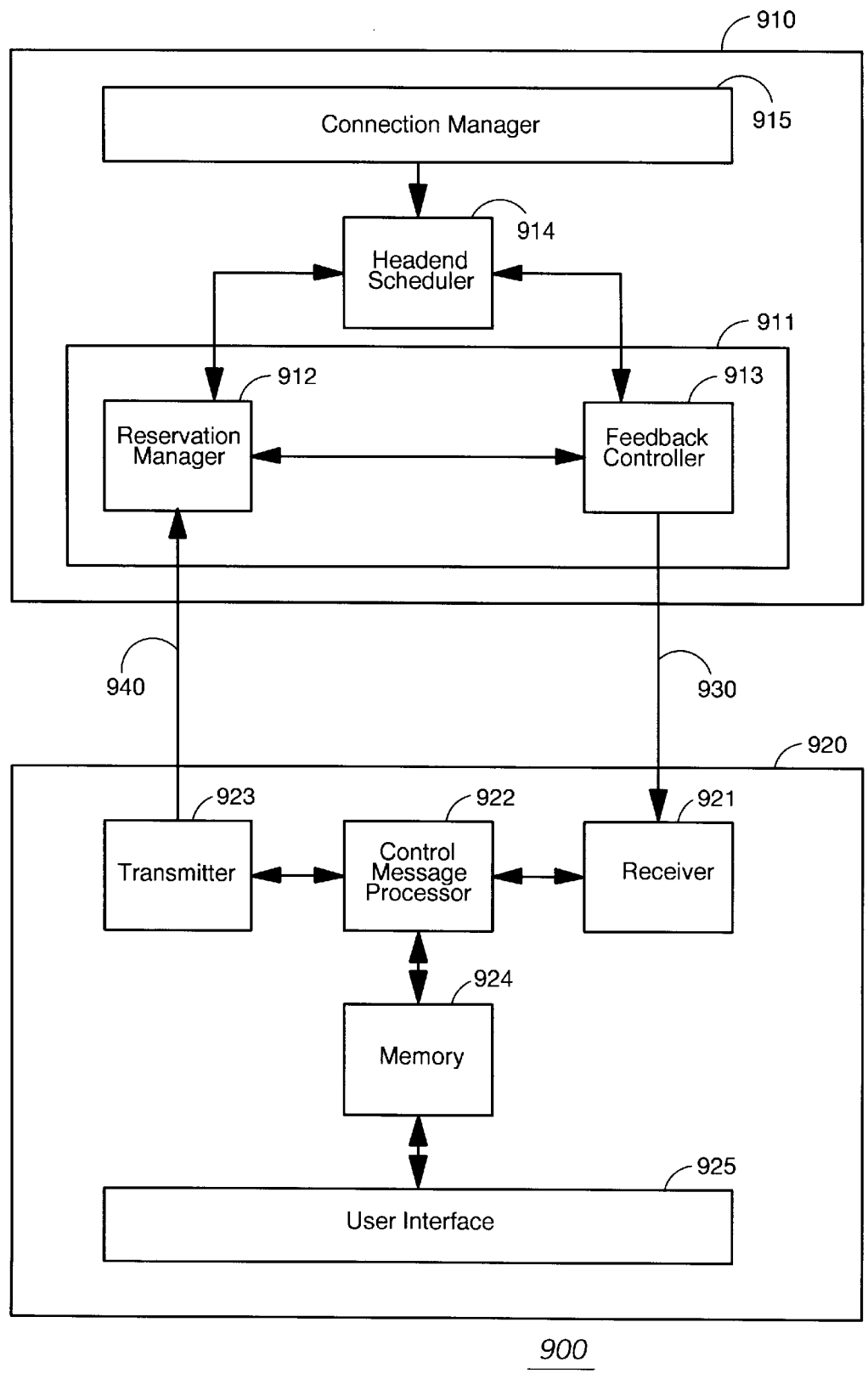
FIG. 9 shows a system comprising a headend unit and an AIU for operating in accordance with the present invention.

FIG. 9 shows a system 900 comprising a headend unit 910 operably coupled to an Access Interface Unit (AIU) 920 by means of a downstream channel 930 and an upstream channel 940. The AIU 920 supports at least one MAC User (not shown). The headend unit 910 transmits control messages including entry poll messages and targeted poll messages to the AIU on downstream channel 930 and receives reservation requests and data from the AIU on upstream channel 940.

The headend unit 910 includes a connection manager 915, a headend scheduler 914, a reservation manager 912, and a feedback controller 913. The reservation manager 912 and the feedback controller 913 together form the adaptive reservation manager 911 which is the subject of the present patent application. The connection manager 915 is responsible for connection admission control to provide an efficient and fair allocation of network resources to individual end users subject to QoS constraints. The connection manager 915 provides the headend scheduler 914 with the QoS requirements of each connection that is admitted to the network. The reservation manager 912 monitors the contention mini-slots on the upstream channel to determine the result of contention for each contention mini-slot. The contention results are fed to the feedback controller 913, which, among other things, maintains the state information for each priority class, determines the assignment of contention mini-slots for each contention cycle, and formats the control messages (i.e., entry poll messages and targeted poll messages) to be transmitted on the downstream channel. The feedback controller 913 consults with the headend scheduler 914 which controls the timing of control message transmissions by the feedback controller 913.

The AIU 920 includes a user interface 925 which receives data for each MAC User supported by the AIU, stores the data in the memory 924, and stores along with the data a timestamp indicating the time of arrival of the data. Also maintained in the memory is the priority class for each MAC User. The AIU 920 also includes a receiver 921 for receiving control messages and a control message processor 922 for generating reservation requests and retrieving messages from the memory 924 which are transmitted onto the upstream channel by transmitter 923.

The control message processor 922 maintains the MAC protocol state for each priority class, maintains the MAC User state for each MAC User, and implements the logic for processing control messages received from the headend unit. Specifically, the control message processor 922 includes logic for identifying the control message as one of an entry poll message and a targeted poll message. If the control message is an entry poll message, additional logic determines the feedback state for each of the plurality of priority classes from the feedback information contained in the entry poll message, updates the collision resolution interval for each of the plurality of priority class, and executes a contention access procedure for each MAC User. If the control message is a targeted poll message, additional logic determines whether the targeted poll message is addressed to one of the number of MAC Users supported by the AIU, and if the targeted poll message is addressed to one of the number of MAC Users supported, transmits an amount of MAC User data from the memory 924 according to an amount of bandwidth allocated to the MAC User updates the MAC User state from ACTIVE to INACTIVE if all of the MAC User data is transmitted.

The present invention may be embodied in other specific forms without departing from the spirit or essential characteristics. The described embodiments are to be considered in all respects only as illustrative and not restrictive.

What is claimed is:

1. A method for determining a number of contention mini-slots for a current contention cycle for each of a plurality of priority classes, each priority class having a previous preferred allocation initially set to one and a priority class state equal to one of a normal state and a collision resolution state, said collision resolution state having a transmitting sub-interval equal to one of an older sub-interval and a newer sub-interval, the method comprising the steps of:

determining an aggregate feedback state for each of the plurality of priority classes based on individual feedback states for a number of contention mini-slots allocated to the priority class in a previous contention cycle, wherein the individual feedback state for each of the number of contention mini-slots represents the result of contention for the contention mini-slot, and wherein the aggregate feedback state is equal to one of NONE, IDLE, COLLISION, and SUCCESS;

determining a preferred allocation of contention mini-slots for each of the plurality of priority classes using the aggregate feedback state, wherein the step of determining the preferred allocation further comprises:

setting a preferred allocation for the priority class equal to the previous preferred allocation, if the aggregate feedback state is NONE;

determining the priority class state;

where the priority class state is equal to the normal state:

setting the preferred allocation equal to zero, if the aggregate feedback state is equal to IDLE;

setting the preferred allocation equal to one, if the aggregate feedback state is equal to SUCCESS; and setting the preferred allocation equal to two, setting the transmitting sub-interval equal to the older sub-interval, and setting the priority class state equal to the collision resolution state, if the aggregate feedback state is equal to COLLISION; and where the priority class state is equal to the collision resolution state:

setting the preferred allocation equal to two and setting the transmitting sub-interval equal to the newer sub-interval, if the transmitting sub-interval is equal to the older sub-interval and the aggregate feedback state is equal to SUCCESS;

setting the preferred allocation equal to two, if the transmitting sub-interval is equal to the older sub-interval and the aggregate feedback state is equal to one of IDLE and COLLISION;

setting the preferred allocation equal to two and setting the transmitting sub-interval equal to the older sub-interval, if the transmitting sub-interval is equal to the newer sub-interval and the aggregate feedback state is equal to COLLISION; and setting the preferred allocation equal to one and setting the priority class state equal to the normal state, if the transmitting sub-interval is equal to the newer sub-interval and the aggregate feedback state is equal to one of IDLE and SUCCESS; and determining an actual allocation of contention mini-slots for each of the plurality of priority classes using the preferred allocation and policy constraints, wherein the step of determining the actual allocation further comprises:

making a preliminary allocation of contention mini-slots for each of the plurality of priority classes based on the preferred allocation for each of the plurality of priority classes; and allocating a number of remaining contention mini-slots among the plurality of priority classes, each priority class having a preliminary allocation of contention mini-slots.

2. The method of claim 1 wherein the step of determining the aggregate feedback state for each of the plurality of priority classes comprises the steps of:

determining the number of contention mini-slots allocated to the priority class in the previous contention cycle;

setting the aggregate feedback state for the priority class equal to NONE if the number of contention mini-slots allocated to the priority class in the previous contention cycle is zero;

determining the individual feedback state for each of the number of contention mini-slots allocated to the priority class in the previous contention cycle;

setting the aggregate feedback state for the priority class equal to IDLE if the individual feedback state for each of the number of contention mini-slots allocated to the priority class in the previous contention cycle indicates that no transmission occurred in the contention mini-slot;

setting the aggregate feedback state for the priority class equal to COLLISION if the individual feedback state for at least one of the number of contention mini-slots allocated to the priority class in the previous contention cycle indicates that a collision occurred in the contention mini-slot; and setting the aggregate feedback state equal to SUCCESS if none of the individual feedback states indicate that a collision occurred and at least one of the individual feedback states indicates that a successful transmission occurred.

3. The method of claim 1 further comprising the steps of:

setting an iteration counter equal to one upon setting the priority class state equal to the collision resolution state;

incrementing the iteration counter, if the transmitting sub-interval is equal to the older sub-interval and the aggregate feedback state is equal to one of IDLE and COLLISION;

incrementing the iteration counter, if the transmitting sub-interval is equal to the newer sub-interval and the aggregate feedback state is equal to COLLISION; and setting the iteration counter equal to zero upon setting the priority class state equal to the normal state.

4. The method of claim 3 further comprising the step of, after setting the preferred allocation equal to two, changing the preferred allocation to one, if the iteration counter exceeds a predetermined maximum number of iterations.

5. The method of claim 4 wherein the predetermined maximum number of iterations is equal to two.

6. The method of claim 1 wherein the step of making the preliminary allocation of contention mini-slots for each of the plurality of priority classes comprises the steps of:

setting a counter equal to a maximum number of contention mini-slots in the contention cycle, said counter representing the number of remaining contention mini-slots in the contention cycle; and executing, for each priority class, beginning with a selected highest priority class, a preliminary allocation procedure comprising the steps of:

making a temporary allocation equal to the larger of:
the preferred allocation for the priority class; and
a predetermined minimum allocation for the priority class;

making the preliminary allocation equal to the smallest of:
a predetermined maximum allocation for the priority class;
the number of remaining contention mini-slots; and
the temporary allocation for the priority class; and decrementing the counter by the preliminary allocation.

7. The method of claim 6 wherein the predetermined minimum allocation for the selected highest priority class is one.

8. The method of claim 6 wherein the predetermined minimum allocation for priority classes other than the selected highest priority class is zero.

9. The method of claim 6 wherein the predetermined maximum allocation for all priority classes is two.

10. The method of claim 6 wherein the step of allocating the number of remaining contention mini-slots comprises, for each priority class, beginning with a selected highest priority class and terminating when the number of remaining contention mini-slots are allocated, allocating one contention mini-slot to the priority class if the preliminary allocation for the priority class is zero contention mini-slots.

11. The method of claim 10 further comprising, for each priority class, beginning with the selected highest priority class and terminating when the number of remaining contention mini-slots are allocated, allocating two contention mini-slots to the priority class if the priority class is allocated one contention mini-slot.

12. The method of claim 6 wherein the step of allocating the number of remaining contention mini-slots comprises, for each priority class, beginning with a selected highest priority class and terminating when the number of remaining contention mini-slots are allocated, determining the least number of contention mini-slots currently allocated to any of the priority classes and allocating one additional contention mini-slot to the priority class if the number of contention mini-slots currently allocated to the priority class is equal to said least number.

13. The method of claim 6 wherein the step of allocating the number of remaining contention mini-slots comprises the steps of:

setting a remaining counter equal to the number of remaining contention mini-slots in the contention cycle;

setting an allocation counter to indicate an allocation of zero contention mini-slots;

executing, for each priority class, beginning with the selected highest priority class, a remaining allocation procedure comprising the steps of:

determining, using the remaining counter, the number of remaining contention mini-slots in the contention cycle;

where the number of remaining contention mini-slots is equal to zero, terminating the step of allocating;

where the number of remaining contention mini-slots is greater than zero, determining whether the number of contention mini-slots allocated to the priority class is equal to the allocation counter and is less than the predetermined maximum allocation for the priority class; and where the number of contention mini-slots allocated to the priority class is equal to the allocation counter and is less than the predetermined maximum allocation for the priority class, allocating one additional contention mini-slot to the priority class and decrementing the remaining counter;

incrementing the allocation counter;

determining whether each priority class has been allocated the predetermined maximum allocation for the priority class;

where each priority class has been allocated the predetermined maximum allocation for the priority class, terminating the step of allocating; and where at least one priority class has been allocated less than the predetermined maximum allocation for the priority class, recycling to the step of executing the remaining allocation procedure.

14. A method for processing an entry poll message received by an Access Interface Unit (AIU) as part of a Medium Access Control (MAC) protocol supporting multiple priority classes, each priority class having a priority class state equal to one of a normal state and a collision resolution state, said AIU supporting a number of MAC Users, each of said MAC Users assigned to one of the priority classes and having a MAC User state equal to one of INACTIVE, CONTENTION, and ACTIVE, and wherein the entry poll message contains individual feedback states for a number of contention mini-slots in a previous contention cycle and an allocation of contention mini-slots for a current contention cycle, the method comprising the steps of:

determining an aggregate feedback state for each priority class from the individual feedback states contained in the entry poll message, wherein the aggregate feedback state is a function of the individual feedback states of the contention mini-slots allocated to the priority class in the previous contention cycle and is equal to one of NONE, IDLE, COLLISION, and SUCCESS;

updating a collision resolution interval for each priority class, wherein the collision resolution interval for each priority class includes a start time, an end time, and a transmitting sub-interval equal to one of an older sub-interval and a newer sub-interval and the step of updating the collision resolution interval for a priority class comprises:

leaving the collision resolution interval unchanged, if the aggregate feedback state is equal to NONE;

determining the priority class state;

where the priority class state is equal to the normal state:

advancing the collision resolution interval, if the aggregate feedback state is equal to one of IDLE and SUCCESS; and splitting the collision resolution interval, setting the transmitting sub-interval equal to the older sub-interval, and setting the priority class state equal to the collision resolution state, if the aggregate feedback state is equal to COLLISION; and where the priority class state is equal to the collision resolution state:

setting the transmitting sub-interval equal to the newer sub-interval, if the transmitting sub-interval is equal to the older sub-interval and the aggregate feedback state is equal to SUCCESS;

splitting the collision resolution interval, if the transmitting sub-interval is equal to the older sub-interval and the aggregate feedback state is equal to one of IDLE and COLLISION;

splitting the collision resolution interval and setting the transmitting sub-interval equal to the older sub-interval, if the transmitting sub-interval is equal to the newer sub-interval and the aggregate feedback state is equal to COLLISION; and advancing the collision resolution interval and setting the priority class state equal to the normal state, if the transmitting sub-interval is equal to the newer sub-interval and the aggregate feedback state is equal to one of IDLE and SUCCESS; and executing a contention access procedure for each MAC User, wherein the step of executing the contention access procedure for each MAC User comprises:

determining the MAC User state for the MAC User;

if the MAC User is in the CONTENTION state, determining whether the MAC User contended in the previous contention cycle;

if the MAC User contended in the previous contention cycle, determining whether the contention resulted in a collision;

if the MAC User did not contend in the previous contention cycle or the MAC User contended in the previous contention cycle and the contention resulted in a collision, determining whether the MAC User is associated with the transmitting sub-interval;

if the MAC User is associated with the transmitting sub-interval, determining whether at least one contention mini-slot is allocated to the priority class associated with the MAC User; and if at least one contention mini-slot is allocated:

selecting one of the number of contention mini-slots allocated for the current contention cycle with equal probability; and transmitting a reservation request in the selected contention mini-slot.

15. The method of claim 14 wherein the step of determining the aggregate feedback state for a priority class comprises the steps of:

setting the aggregate feedback state for the priority class equal to NONE if the number of contention mini-slots allocated to the priority class in the previous contention cycle is zero;

setting the aggregate feedback state equal to IDLE if the individual feedback state for each of the number of contention mini-slots allocated to the priority class in the previous contention cycle indicates that no transmission occurred in the contention mini-slot;

setting the aggregate feedback state equal to COLLISION if the individual feedback state for at least one of the number of contention mini-slots allocated to the priority class in the previous contention cycle indicates that a collision occurred in the contention mini-slot; and setting the aggregate feedback state equal to SUCCESS if none of the individual feedback states indicate that a collision occurred and at least one of the individual feedback states indicates that a successful transmission occurred.

16. The method of claim 14 wherein the step of advancing the collision resolution interval comprises setting the new start time equal to the end time and setting the new end time equal to the earlier of a present time and a time that is a predetermined increment from the new start time.

17. The method of claim 14 wherein the step of splitting the collision resolution interval comprises the step of setting the new end time to a split time which is between the start time and the end time.

18. The method of claim 17 wherein the split time is equal to the midpoint between the start time and the end time.

19. The method of claim 14 wherein the step of setting the transmitting sub-interval equal to the newer sub-interval comprises the steps of:
   determining an interval duration equal to the difference between the end time and the start time;
   advancing the start time by the interval duration; and
   advancing the end time by the interval duration.

20. The method of claim 14 wherein the step of determining whether the MAC User is associated with the transmitting sub-interval comprises determining whether the oldest data awaiting transmission was received during the transmitting sub-interval.

21. The method of claim 14 further comprising the step of setting the MAC User state equal to ACTIVE, if the MAC User contended in the previous contention cycle and the contention did not result in a collision.

22. A device for determining a number of contention mini-slots for a current contention cycle for each of a plurality of priority classes, the device comprising:
   logic for determining an aggregate feedback state for each of the plurality of priority classes based on individual feedback states for a number of contention mini-slots allocated in the previous contention cycle, wherein the individual feedback state for each of the number of contention mini-slots represents the result of contention for the contention mini-slot, and wherein the aggregate feedback state is equal to one of NONE, IDLE, COLLISION, and SUCCESS;
   logic for determining a preferred allocation of contention mini-slots for each of the plurality of priority classes using the aggregate feedback state;
   logic for making a preliminary allocation of contention mini-slots for each of the plurality of priority classes based on the preferred allocation for each of the plurality of priority classes, wherein the logic for making the preliminary allocation of contention mini-slots for each of the plurality of priority classes comprises:
      logic for setting a counter equal to a maximum number of contention mini-slots in the contention cycle, said counter representing the number of remaining contention mini-slots in the contention cycle; and
      logic for executing, for each priority class, beginning with a selected highest priority class, a preliminary allocation procedure comprising the steps of:
         making a temporary allocation equal to the larger of:
            the preferred allocation for the priority class; and
            a predetermined minimum allocation for the priority class;
         making the preliminary allocation equal to the smallest of;
            a predetermined maximum allocation for the priority class:
            the number of remaining contention mini-slots; and
            the temporary allocation for the priority class; and
         decrementing the counter by the preliminary allocation; and
   logic for allocating a number of remaining contention mini-slots among the plurality of priority classes, each priority class having a preliminary allocation of contention mini-slots.

23. The device of claim 22 wherein the predetermined minimum allocation for the selected highest priority class is one.

24. The device of claim 22 wherein the predetermined minimum allocation for priority classes other than the selected highest priority class is zero.

25. The device of claim 22 wherein the predetermined maximum allocation for all priority classes is two.

26. The device of claim 22 wherein the logic for allocating the number of remaining contention mini-slots comprises, for each priority class, beginning with a selected highest priority class and terminating when the number of remaining contention mini-slots are allocated, logic for allocating one contention mini-slot to the priority class if the priority class is allocated zero contention mini-slots.

27. The device of claim 26 further comprising, for each priority class, beginning with the selected highest priority class and terminating when the number of remaining contention mini-slots are allocated, logic for allocating two contention mini-slots to the priority class if the priority class is allocated one contention mini-slot.

28. The device of claim 22 wherein the logic for allocating the number of remaining contention mini-slots comprises, for each priority class, beginning with a selected highest priority class and terminating when the number of remaining contention mini-slots are allocated, logic for determining the least number of contention mini-slots currently allocated to any of the priority classes and for allocating one additional contention mini-slot to the priority class if the number of contention mini-slots currently allocated to the priority class is equal to said least number.

29. The device of claim 22 wherein the logic for allocating the number of remaining contention mini-slots comprises the steps of:
   setting a remaining counter equal to the number of remaining contention mini-slots in the contention cycle;
   setting an allocation counter to indicate an allocation of zero contention mini-slots;
   executing, for each priority class, beginning with the selected highest priority class, a remaining allocation procedure comprising the steps of:
      determining, using the remaining counter, the number of remaining contention mini-slots in the contention cycle;
      where the number of remaining contention mini-slots is equal to zero, terminating the step of allocating;
      where the number of remaining contention mini-slots is greater than zero, determining whether the number of contention mini-slots allocated to the priority class is equal to the allocation counter and is less than the predetermined maximum allocation for the priority class; and where the number of contention mini-slots allocated to the priority class is equal to the allocation counter and is less than the predetermined maximum allocation for the priority class, allocating one additional contention mini-slot to the priority class and decrementing the remaining counter;

incrementing the allocation counter;

determining whether each priority class has been allocated the predetermined maximum allocation for the priority class;

where each priority class has been allocated the predetermined maximum allocation for the priority class, terminating the step of allocating; and where at least one priority class has been allocated less than the predetermined maximum allocation for the priority class, recycling to the step of executing the remaining allocation procedure.

30. A device for processing an entry poll message received by an Access Interface Unit (AIU) as part of a Medium Access Control (MAC) protocol supporting multiple priority classes, each priority class having a priority class state equal to one of a normal state and a collision resolution state, said AIU supporting a number of MAC Users, each of said MAC Users assigned to one of the priority classes and having a MAC User state equal to one of INACTIVE, CONTENTION, and ACTIVE, and wherein the entry poll message contains individual feedback states for a number of contention mini-slots in a previous contention cycle and an allocation of contention mini-slots for a current contention cycle, the device comprising:

logic for determining an aggregate feedback state for each priority class from the individual feedback states contained in the entry poll message, wherein the aggregate feedback state is a function of the individual feedback states of the contention mini-slots allocated to the priority class in the previous contention cycle and is equal to one of NONE, IDLE, COLLISION, and SUCCESS;

logic for updating a collision resolution interval for each priority class, wherein the collision resolution interval for each priority class includes a start time, an end time, and a transmitting sub-interval equal to one of an older sub-interval and a newer sub-interval and wherein the logic for updating the collision resolution interval for a priority class comprises:

logic for leaving the collision resolution interval unchanged, if the aggregate feedback state is equal to NONE;

logic for determining the priority class state;

where the priority class state is equal to the normal state:

logic for advancing the collision resolution interval, if the aggregate feedback state is equal to one of IDLE and SUCCESS; and logic for splitting the collision resolution interval, setting the transmitting sub-interval equal to the older sub-interval, and setting the priority class state equal to the collision resolution state, if the aggregate feedback state is equal to COLLISION; and where the priority class state is equal to the collision resolution state:

logic for setting the transmitting sub-interval equal to the newer sub-interval, if the transmitting sub-interval is equal to the older sub-interval and the aggregate feedback state is equal to SUCCESS;

logic for splitting the collision resolution interval, if the transmitting sub-interval is equal to the older sub-interval and the aggregate feedback state is equal to one of IDLE and COLLISION;

logic for splitting the collision resolution interval and setting the transmitting sub-interval equal to the older sub-interval, if the transmitting sub-interval is equal to the newer sub-interval and the aggregate feedback state is equal to COLLISION; and logic for advancing the collision resolution interval and setting the priority class state equal to the normal state, if the transmitting sub-interval is equal to the newer sub-interval and the aggregate feedback state is equal to one of IDLE and SUCCESS; and logic for executing a contention access procedure for each MAC User, wherein the logic for executing the contention access procedure for each MAC User comprises:

logic for determining the MAC User state for the MAC User;

if the MAC User is in the CONTENTION state, logic for determining whether the MAC User contended in the previous contention cycle;

if the MAC User contended in the previous contention cycle, logic for determining whether the contention resulted in a collision;

if the MAC User did not contend in the previous contention cycle or the MAC User contended in the previous contention cycle and the contention resulted in a collision, logic for determining whether the MAC User is associated with the transmitting sub-interval;

if the MAC User is associated with the transmitting sub-interval, logic for determining whether at least one contention mini-slot is allocated to the priority class associated with the MAC User; and if at least one contention mini-slot is allocated:

logic for selecting one of the number of contention mini-slots allocated for the current contention cycle with equal probability; and logic for transmitting a reservation request in the selected contention mini-slot.

31. The device of claim 30 wherein the logic for determining the aggregate feedback state for a priority class comprises:

logic for setting the aggregate feedback state for the priority class equal to NONE if the number of contention mini-slots allocated to the priority class in the previous contention cycle is zero;

logic for setting the aggregate feedback state equal to IDLE if the individual feedback state for each of the number of contention mini-slots allocated to the priority class in the previous contention cycle indicates that no transmission occurred in the contention mini-slot;

logic for setting the aggregate feedback state equal to COLLISION if the individual feedback state for at least one of the number of contention mini-slots allocated to the priority class in the previous contention cycle indicates that a collision occurred in the contention mini-slot; and logic for setting the aggregate feedback state equal to SUCCESS if none of the individual feedback states indicate that a collision occurred and at least one of the individual feedback states indicates that a successful transmission occurred.

32. The device of claim 30 wherein the logic for advancing the collision resolution interval comprises logic for setting the new start time equal to the end time and setting the new end time equal to the earlier of a present time and a time that is a predetermined increment from the new start time.

33. The device of claim 30 wherein the logic for splitting the collision resolution interval comprises logic for setting the new end time to a split time which is between the start time and the end time.

34. The device of claim 33 wherein the split time is equal to the midpoint between the start time and the end time.

35. The device of claim 30 wherein the logic for setting the transmitting sub-interval equal to the newer sub-interval comprises:
   logic for determining an interval duration equal to the difference between the end time and the start time;
   logic for advancing the start time by the interval duration; and
   logic for advancing the end time by the interval duration.

36. The device of claim 30 wherein the logic for determining whether the MAC User is associated with the transmitting sub-interval comprises logic for determining whether the oldest data awaiting transmission was received during the transmitting sub-interval.

37. The device of claim 30 further comprising logic for setting the MAC User state equal to ACTIVE, if the MAC User contended in the previous contention cycle and the contention did not result in a collision.

38. A system having a single headend unit in communication with at least one Access Interface Unit (AIU) by means of a shared medium, each AIU supporting at least one MAC User, the system utilizing a method for sharing contention mini-slots among multiple priority classes comprising the steps of:
   by the headend unit:
      determining an aggregate feedback state for each of the plurality of priority classes based on individual feedback states for a number of contention mini-slots allocated to the priority class in a previous contention cycle, wherein the individual feedback state for each of the number of contention mini-slots represents the result of contention for the contention mini-slot, and wherein the aggregate feedback state is equal to one of NONE, IDLE, COLLISION, and SUCCESS;
      determining a preferred allocation of contention mini-slots for each of the plurality of priority classes using the aggregate feedback state, wherein the step of determining the preferred allocation further comprises:
         setting a preferred allocation for the priority class equal to the previous preferred allocation, if the aggregate feedback state is NONE;
         determining the priority class state;
         where the priority class state is equal to the normal state:
            setting the preferred allocation equal to zero, if the aggregate feedback state is equal to IDLE;
            setting the preferred allocation equal to one, if the aggregate feedback state is equal to SUCCESS; and
            setting the preferred allocation equal to two, setting the transmitting sub-interval equal to the older sub-interval, and setting the priority class state equal to the collision resolution state, if the aggregate feedback state is equal to COLLISION; and
         where the priority class state is equal to the collision resolution state:
            setting the preferred allocation equal to two and setting the transmitting sub-interval equal to the newer sub-interval, if the transmitting sub-interval is equal to the older sub-interval and the aggregate feedback state is equal to SUCCESS;
            setting the preferred allocation equal to two, if the transmitting sub-interval is equal to the older sub-interval and the aggregate feedback state is equal to one of IDLE and COLLISION;
            setting the preferred allocation equal to two and setting the transmitting sub-interval equal to the older sub-interval, if the transmitting sub-interval is equal to the newer sub-interval and the aggregate feedback state is equal to COLLISION; and
            setting the preferred allocation equal to one and setting the priority class state equal to the normal state, if the transmitting sub-interval is equal to the newer sub-interval and the aggregate feedback state is equal to one of IDLE and SUCCESS;
      determining an actual allocation of contention mini-slots for each of the plurality of priority classes using the preferred allocation and policy constraints, wherein the step of determining the actual allocation further comprises:
         making a preliminary allocation of contention mini-slots for each of the plurality of priority classes based on the preferred allocation for each of the plurality of priority classes; and
         allocating a number of remaining contention mini-slots among the plurality of priority classes, each priority class having a preliminary allocation of contention mini-slots; and
      transmitting an entry poll message containing the individual feedback states for the number of contention mini-slots in the previous contention cycle and the allocation of contention mini-slots for each of the priority classes; and
   by the AIU:
      receiving the entry poll message;
      determining an aggregate feedback state for each priority class from the individual feedback states contained in the entry poll message, wherein the aggregate feedback state is a function of the individual feedback states of the contention mini-slots allocated to the priority class in the previous contention cycle and is equal to one of NONE, IDLE, COLLISION, and SUCCESS;
      updating a collision resolution interval for each priority class, wherein the collision resolution interval for each priority class includes a start time, an end time, and a transmitting sub-interval equal to one of an older sub-interval and a newer sub-interval and the step of updating the collision resolution interval for a priority class comprises:
         leaving the collision resolution interval unchanged, if the aggregate feedback state is equal to NONE;
         determining the priority class state;
         where the priority class state is equal to the normal state:
            advancing the collision resolution interval, if the aggregate feedback state is equal to one of IDLE and SUCCESS; and splitting the collision resolution interval, setting the transmitting sub-interval equal to the older sub-interval, and setting the priority class state equal to the collision resolution state, if the aggregate feedback state is equal to COLLISION; and where the priority class state is equal to the collision resolution state:

setting the transmitting sub-interval equal to the newer sub-interval, if the transmitting sub-interval is equal to the older sub-interval and the aggregate feedback state is equal to SUCCESS;

splitting the collision resolution interval, if the transmitting sub-interval is equal to the older sub-interval and the aggregate feedback state is equal to one of IDLE and COLLISION;

splitting the collision resolution interval and setting the transmitting sub-interval equal to the older sub-interval, if the transmitting sub-interval is equal to the newer sub-interval and the aggregate feedback state is equal to COLLISION; and advancing the collision resolution interval and setting the priority class state equal to the normal state, if the transmitting sub-interval is equal to the newer sub-interval and the aggregate feedback state is equal to one of IDLE and SUCCESS; and executing a contention access procedure for each MAC User, wherein the step of executing the contention access procedure for each MAC User comprises:

determining the MAC User state for the MAC User;

if the MAC User is in the CONTENTION state, determining whether the MAC User contended in the previous contention cycle;

if the MAC User contended in the previous contention cycle, determining whether the contention resulted in a collision;

if the MAC User did not contend in the previous contention cycle or the MAC User contended in the previous contention cycle and the contention resulted in a collision, determining whether the MAC User is associated with the transmitting sub-interval;

if the MAC User is associated with the transmitting sub-interval, determining whether at least one contention mini-slot is allocated to the priority class associated with the MAC User; and if at least one contention mini-slot is allocated:
selecting one of the number of contention mini-slots allocated for the current contention cycle with equal probability; and
transmitting a reservation request in the selected contention mini-slot.

* * * * *